(No Model.)
N. W. REW.
HARROW ATTACHMENT FOR PLOWS.
No. 347,380. Patented Aug. 17, 1886.
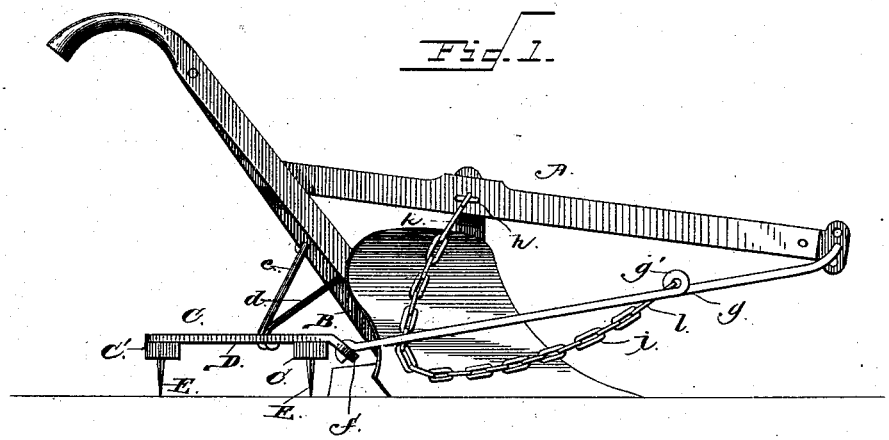
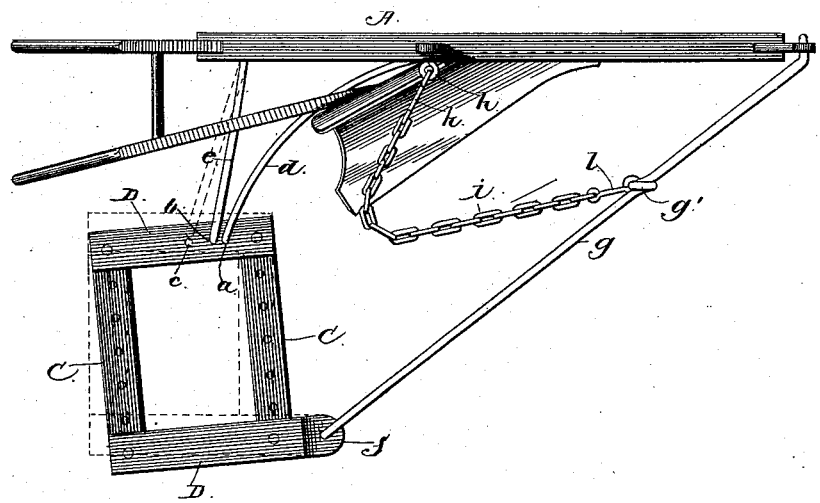
Witnesses
E. G. Siggers
J. W. Garner
Inventor
Noel W. Rew
By his Attorneys

UNITED STATES PATENT OFFICE.

NOEL WESTON REW, OF GARDEN CITY, MINNESOTA.

HARROW ATTACHMENT FOR PLOWS.

SPECIFICATION forming part of Letters Patent No. 347,380, dated August 17, 1886.

Application filed May 29, 1886. Serial No. 203,671. (No model.)

*To all whom it may concern:*

Be it known that I, NOEL WESTON REW, a citizen of the United States, residing at Garden City, in the county of Blue Earth and State of Minnesota, have invented a new and useful Improvement in Harrow Attachments for Plows, of which the following is a specification.

My invention relates to an improvement in harrow attachments for plows; and it consists in the peculiar construction and combination of devices that will be more fully set forth hereinafter, and particularly pointed out in the claims.

In the drawings, Figure 1 is a side elevation of a plow provided with my improved harrow attachments. Fig. 2 is a top plan view of the same.

A represents a plow which is of the ordinary construction. One of the plow-handles is provided with a depending standard, B, which extends to the landside of a plow, and is attached thereto.

C represents the harrow, which is here shown as consisting of two parallel obliquely-arranged beams, C', connected at their extremities by means of metallic straps D, and provided each with a series of harrow-teeth, E. The strap D on the inner side of the harrow attachment is provided with a series of openings, $a$, $b$, and $c$. A brace-rod, $d$, extends from one side of the plow-standard and outwardly from the same, in rear of the mold-board, and the rear outer end of the said brace-rod is attached to the opening $a$.

$e$ represents a brace-rod, the inner end of which is attached to an opening made in the standard B of the plow-handle, and the outer end of which is attached to the opening $b$ of the harrow. The outer strap of the said harrow is provided on its front end with an extended ear, $f$, having an opening to which is connected the rear end of an oblique brace-rod or arm, $g$. The front end of the said rod is attached to the plow-clevis.

From the foregoing description, and by reference to the accompanying drawings, it will be seen that the harrow attachment is supported upon one side of the mold-board side of the plow, and is maintained in an oblique position by the rods $e$, $b$, and $g$, so that as the plow is drawn along the harrow is caused to run over the last furrow which was turned by the plow-share and thoroughly harrow the same, thus combining the operations of plowing and harrowing the ground, and effecting a great economy of time and labor. In the rod $g$, near the front end of the same, is formed a ring, $g'$, and from one side of the plow-beam, in a line with the plow-standard, is a ring, $h$.

$i$ represents the drag-chain, which is provided at one end with a hook, $k$, adapted to engage the ring $h$, and at the opposite end with a hook, $l$, adapted to engage the ring $g'$, and thus secure the said drag-chain to the rod $g$ and the plow-beam. The function of this drag-chain, which is drawn along the ground on the mold-board side of the plow, and in advance of the harrow, is to clear away trash and stones or other obstructions.

If it is desired to cause the harrow attachment to run at right angles from the plow, this may be effected by detaching the rod E from the opening $b$ and attaching the said rod to the opening $c$, as shown in dotted lines in Fig. 2.

A harrow attachment thus constructed is cheap and simple, and is adapted to harrow the ground simultaneously with the operation of plowing it, thus effecting great economy of time and labor.

Having thus described my invention, I claim—

1. The combination of the plow, the harrow, the rod connecting the harrow to the plow, and the drag-chain running in advance of the harrow and on the mold-board side of the plow, for the purposes set forth, substantially as described.

2. The combination, with the plow, of the harrow having the openings $a$, $b$, and $c$ on its inner side, the rod $g$, attached to the front end of the plow-beam and to the outer end of the harrow, the rod $d$, extending from the plow-standard and attached to the opening $a$ of the harrow, and the rod $e$, extending laterally from the plow and adapted to be attached to either of the openings $b$ and $c$, for the purpose set forth, substantially as described.

3. The combination of the plow, the harrow, the oblique rod $g$, extending from the plow-beam to the harrow, and the drag-chain having one end attached to the said rod and the other end attached to the plow, in advance of the harrow, for the purpose set forth, substantially as described.

I testimony that I claim the foregoing as my own I have hereto affixed my signature in presence of two witnesses.

NOEL WESTON REW.

Witnesses:
E. B. EVANS,
L. T. SHAW.